United States Patent Office 3,334,989
Patented Aug. 8, 1967

3,334,989
METHOD OF DEFOLIATING PLANTS
Arthur M. Imel, Jr., Nampa, Idaho, and Stassen Y. C. Soong, Taipei, Taiwan, assignors to Stauffer Chemical Company, New York, N.Y., a corporation of Delaware
No Drawing. Filed Dec. 29, 1966, Ser. No. 605,591
6 Claims. (Cl. 71—72)

ABSTRACT OF THE DISCLOSURE

Defoliating compositions for growing plants having as their active component compounds of the class pseudothiourea hydrohalides represented by the formula

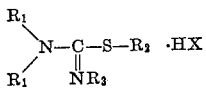

wherein X is chlorine or bromine; $R_1$ is lower alkyl having from 1 to 6 carbon atoms, inclusive, lower alkenyl having 2 to 6 carbon atoms, inclusive or alkylene radicals having 4 to 6 carbon atoms, inclusive; $R_2$ can be alkyl, 1 to 14 carbons, or halophenylalkyl, and $R_3$ can be lower alkyl, 1 to 6 carbons, or lower alkenyl, 2 to 6 carbons; for example, 2-(3,4-dichlorobenzyl)-1,1-hexamethylene-3-allyl-2-pseudothiourea hydrochloride and 2-(n-dodecyl)-1,1-di-n-butyl-3-ethyl-2-pseudothiourea hydrobromide.

---

This application is a continuation-in-part of our copending application, Ser. No. 364,757, filed May 4, 1964, now abandoned. This invention relates to the defoliation of growing plants by using certain pseudothiourea hydrohalides as active defoliating agents. More particularly, the invention pertains to such new and novel use of defoliating compositions having as their active component the compounds represented by the following formula

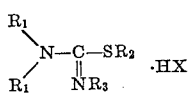

wherein X is selected from the group consisting of chlorine and bromine; $R_1$ is selected from the group consisting of lower alkyl having from 1 to 6 carbon atoms, inclusive, and lower alkenyl having from 2 to 6 carbon atoms, inclusive, and alkylene radicals having 4 to 6 carbon atoms, inclusive; $R_2$ is selected from the group consisting of alkyl having from 1 to 14 carbon atoms and halophenylalkyl, and $R_3$ is selected from the group consisting of lower alkyl having from 1 to 6 carbon atoms, inclusive, and lower alkenyl having from 2 to 6 carbon atoms, inclusive. Both valencies of said divalent alkylene radicals are satisfied by the nitrogen bonded thereto.

As examples of organic lower alkyl groups which can be used for $R_1$ and $R_3$ are methyl, ethyl, propyl, butyl and hexyl. Similarly, examples of lower alkenyl having from 2 to 6 carbon atoms are vinyl, allyl, iso-propenyl, 2-butenyl, 2-pentenyl, 1,2-butadienyl and 2-hexenyl. As examples of organic alkyl radicals which can be used for $R_2$ having from 1 to 14 carbon atoms are methyl, ethyl, n-propyl, iso-propyl, n-butyl, sec-butyl, pentyl, tetropentyl, n-hexyl, iso-hexyl, n-heptyl, n-octyl, n-decyl, n-dodecyl and n-tetrodecyl.

It has been known for many years that in order to obtain the maximum crop from a large variety of plants, in particular those plants with dense foliage growth that yield a crop which is field-harvested, it is particularly advantageous to alter the growth of the non-harvestable portion of a plant in order to hasten the maturity and thereby make accessible or improve the quality of the harvestable portion of a plant.

It is known that many chlorophyllaceous plants normally undergo defoliation during their life cycle at maturity. It is desirable therefore to administer to such plants a chemical which will cause a premature leaf crop, thereby fulfilling the above mentioned objectives.

Normal leaf drop will occur by means of a mechanism essentially little understood. However, there are certain naturally occurring factors known to produce this effect. For example, a decrease in ambient temperature at the proper period in the life cycle of the plant, an injury, disease or adverse growing conditions may bring about defoliation.

None of the above mentioned examples of defoliation are available as a means of controlling accelerated leaf drop at will. Therefore it is desirable to apply to the plant a substance that will accelerate dropping of the leaves without destroying or otherwise injuring the harvestable portion of the plant. Any substance which can duplicate the effect of natural leaf drop is commonly called a defoliant or defoliating agent. For economic reasons a defoliant must be effective at relatively low concentrations. Defoliants may be applied to various plants such as castor beans, soy beans, seed crops, fruit trees, certain nursery plants, and particularly to cotton plants. The primary use concerned within the present application is in the defoliation of cotton plants, kidney bean plants, soy bean plants and tomato plants. The present invention relates to a method of defoliating all types of plants which normally have an annual leaf drop.

In normal cotton plants which are not treated with defoliating agents, the bolls on the lower branches open first while the bolls on the upper branches continue to open slowly over a period of as long as two months from the time when picking of the lower bolls is desirable. The majority of leaves remain attached to the cotton plant and cause green stains on the cotton when mechanical cotton pickers are employed. At the same time, the amount of trash in mechanically harvested cotton is greater than in hand-picked cotton. The amount can be reduced and the grade correspondingly raised if the leaves are removed prior to picking. Such defofiation is a necessity with some types of mechanical pickers and it is helpful even with hand-picking operations. In addition, the leaves high on the plant shade the lower bolls from sunlight and air, causing excessive boll rot.

The use of defoliants on cotton has been discussed above; however, as will be seen below the compounds of the present invention are useful as defoliants on a number of plants.

It is therefore, the object of the present invention to induce defoliation of plants by the application thereto of pseudothiourea hydrohalides characterized by the formula

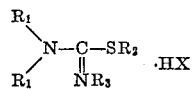

as heretofore described. A further object is the present defoliation compositions which enhance the value of the agricultural crops, accelerate the crop maturity and allow for maximum harvest to be obtained by causing premature leaf drop.

The following pseudothiourea hydrohalides can be prepared in general by the reaction of an alkyl or substituted aralkyl halide with the appropriate thiourea. The reaction can be carried out in an inert solvent or preferably in no solvent. Approximately stoichiometric quantities of halide was added to the appropriate thiourea and heated to the reflux temperature of the solvent or warmed on a steam bath. The product can be obtained by evaporative concentration of the resulting solution.

The following example illustrates the method of preparation of the compounds of the present invention.

Example 1

*Preparation of 2 - (3,4 - dichlorobenzyl) - 1,1 - hexamethylene - 3 - allyl - 2 - pseudothiourea hydrochloride.*—3-allyl-1,1-di-hexamethylene thiourea 5.0 g. (0.025 mole) and 5.0 g. (0.025 mole) of $\alpha,3,4$-trichloro toluene were dissolved in 50 cc. of methanol and heated at reflux on a steam bath for ½ hour. The resulting solution was concentrated by evaporation yielding 10.0 g. (100% of theory) of an oil $n_D^{30}=1.5551$.

Likewise, using the appropriate organic halide and thiourea the following list of pseudothioureas were prepared. Compound numbers have been assigned to each compound and are used throughout the balance of the application.

TABLE 1

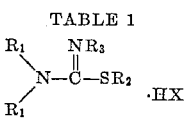

| Compound Number | X | R₁ | R₂ | R₃ | $n_D^{30}$ |
|---|---|---|---|---|---|
| 1 | Cl | Hexamethylene | 3,4-dichlorobenzyl | Allyl | 1.5551 |
| 2 | Br | n-Butyl | n-Dodecyl | Ethyl | 1.4930 |
| 3 | Br | Allyl | n-Decyl | do | 1.5170 |
| 4 | Br | do | n-Dodecyl | do | 1.5092 |
| 5 | Br | do | n-Octyl | Allyl | 1.5235 |
| 6 | Br | do | n-Decyl | do | 1.5101 |
| 7 | Br | do | n-Dodecyl | do | 1.5100 |
| 8 | Br | do | n-Decyl | Methyl | 1.5042 |
| 9 | Br | do | n-Octyl | n-Butyl | 1.5245 |
| 10 | Br | do | n-Heptyl | do | 1.5245 |

The defoliating properties of the compositions according to the present invention were tested on various plants as described in the following example.

Example 2

*Defoliant evaluation test.*—To evaluate the defoliating properties of the compounds according to the present invention, mature cotton plants, kidney bean, soybean and tomato plants were sprayed with aqueous emulsions of the active compounds of the invention. The rate of application was equivalent to two and four pounds of the active candidate in 80 gallons of emulsion for each planted area. The treated plants were then stored in a greenhouse and inspected at 24-hour intervals. Initial observations were taken at four days and final evaluation was made at the end of ten days. Percentage defoliation was calculated by dividing the number of fallen leaves by the number of leaves originally attached. Results of such tests with the compounds of the invention are reported in the following table.

TABLE 2.—DEFOLIATION ACTIVITY OF PSEUDOTHIOUREAS ON FOUR CROP SPECIES

| Compound Number | Cotton, 4 lbs./acre | Kidney Beans 4 lbs./acre | Kidney Beans 2 lbs./acre | Soybean, 4 lbs./acre | Tomato, 4 lbs./acre |
|---|---|---|---|---|---|
|  | Percent | Percent | Percent | Percent | Percent |
| 1 | 75 |  |  | 100 |  |
| 2 | 100 | 80 | 95 | 100 | 15 |
| 3 | 100 | 64 | 40 | 33 | 55 |
| 4 | 100 | 73 | 88 | 67 | 94 |
| 5 | 67 | 100 | 100 | 100 |  |
| 6 | 87 | 80 | 100 | 100 | 75 |
| 7 | 100 | 80 | 86 | 67 | 85 |
| 8 | 100 | 57 |  | 100 |  |
| 9 | 80 |  |  |  |  |
| 10 | 60 |  |  |  |  |

It is apparent from the above tables that all the compounds listed exhibit some degree of defoliation activity. Even those compounds which showed lower activity would be successful if applied at a sufficient concentration.

The new and novel defoliating compositions herein described may be applied to plants in the form of solutions, emulsions, dusts, or aerosols, according to procedures well-known in the art. Aqueous, as well as non-aqueous solutions are equally suitable. Dusts may be prepared directly at field strength using well-known absorbent clays or talcs or they may be prepared as concentrates which may then be diluted with inert diluents for field application.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. A method of defoliating plants which comprises applying thereto in an amount sufficient to cause defoliation a pseudothiourea hydrohalide corresponding to the formula

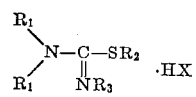

wherein X is selected from the group consisting of chlorine and bromine, $R_1$ is selected from the group consisting of lower alkyl having from 1 to 6 carbon atoms, inclusive, and lower alkenyl having from 2 to 6 carbon atoms, inclusive, and alkylene radicals having 4 to 6 carbon atoms, inclusive; $R_2$ is selected from the group consisting of alkyl having from 1 to 14 carbon atoms and halophenylalkyl, and $R_3$, is selected from the group consisting of lower alkyl having from 1 to 6 carbon atoms, inclusive, and lower alkenyl having from 2 to 6 carbon atoms, inclusive.

2. A method of defoliating plants which comprises applying thereto in an amount sufficient to cause defoliation, 2 - (3,4 - dichlorobenzyl) - 1,1 - hexamethylene - 3 - allyl - 2 - pseudothiourea hydrochloride.

3. A method of defoliating plants which comprises applying thereto in an amount sufficient to cause defoliation, 2 - (n - dodecyl) - 1,1 - di - n - butyl - 3 - ethyl - 2 - pseudothiourea hydrobromide.

4. A method of defoliating plants which comprises applying thereto in an amount sufficient to cause defoliation, 2 - (n - dodecyl) - 1,1 - diallyl - 3 - ethyl - 2 - pseudothiourea hydrobromide.

5. A method of defoliating plants which comprises applying thereto in an amount sufficient to cause defoliation, 2 - (n - decyl) - 1,1 - diallyl - 3 - allyl - 2 - pseudothiourea hydrobromide.

6. A method of defoliating plants which comprises applying thereto in an amount sufficient to cause defoliation, 2 - (n - octyl) - 1,1 - diallyl - 3 - n - butyl - 2 - pseudothiourea hydrobromide.

References Cited

UNITED STATES PATENTS 2,849,306  8/1958  Searle _____ 71—2.6

FOREIGN PATENTS 945,808  1/1964  Great Britain.

LEWIS GOTTS, *Primary Examiner.*
JAMES O. THOMAS, JR., *Examiner.*